Figure 1:
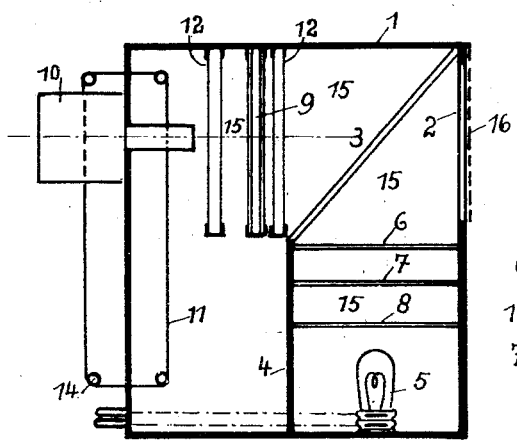

Sept. 1, 1931.　　　F. FLEISCHER　　　1,821,626

PRODUCING PROJECTION PICTURES

Filed March 4, 1927

Patented Sept. 1, 1931

1,821,626

UNITED STATES PATENT OFFICE

FRITZ FLEISCHER, OF WEIMAR, GERMANY

PRODUCING PROJECTION PICTURES

Application filed March 4, 1927, Serial No. 172,765, and in Germany December 13, 1926.

This invention refers broadly to means of obtaining plastic pictural representations by optical delusions whereby so to speak stereoscopic corporeal pictures of scenery, persons and figures are obtained which impress the observer as though they were freely floating or moving in space. Such representations among other uses may for instance be employed for advertising and entertainment purposes and in accordance with this invention are based upon the well-known optical observation that by means of an inclined transparent mirror or glass plate and a source of light any suitable body may be made to appear to the eye of an observer. This optical principle is utilized according to the invention in a novel manner for the purpose of reproducing plastic impressions of representations with pictures moving therein and to utilize the same for advertising and entertainment purposes. With this end in view two or more transparent or opaque pictures showing different portions of the plastic representation to be obtained and disposed at different distances from the transparent mirror or reflecting glass plate which is inclined with relation thereto are simultaneously illuminated or the light is caused to pass through them and into the plastic representation thus obtained one or more moving pictures are projected by means of a reproduction plate disposed at a suitable distance from the mirror or reflecting glass plate. By means of this combination of a, so to speak, step-wise arranged immovable pictural representation with the projection of a living or moving picture it becomes possible to reproduce by simple means a moving scenery within a surounding appearing as a plastic representation, so as to increase the plastic or corporeal impression both of the moving parts of the scenery as well as of the surroundings. Thus it is possible in this manner to reproduce for instance a moving figure in a landscape or in any desired kind of scenery. By changing the distance of the reproducing surface of the projected picture from the mirror or by changing the distance of the picture plates of the immovable plastic representation from the mirror the relative position of the moving picture and of the immovable plastic representation may be modified in any desired manner. The constituent parts of the plastic picture, as well as the moving picture itself may be changed as desired, and the relative combination of moving picture and of surrounding scenery is also capable of unlimited variation. Thus, the most varying impressions may be produced for advertising and entertainment purposes, and the existence of a moving representation in an immovable surrounding renders the total picture exceedingly striking and attractive, and it is a great advantage that these results are produced by very simple means and that the costs of operation are very low.

Figure 2:
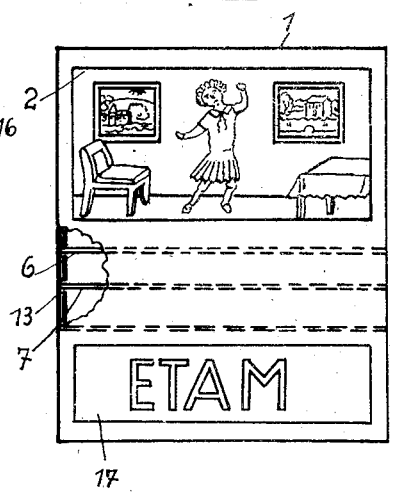
Figure 3:
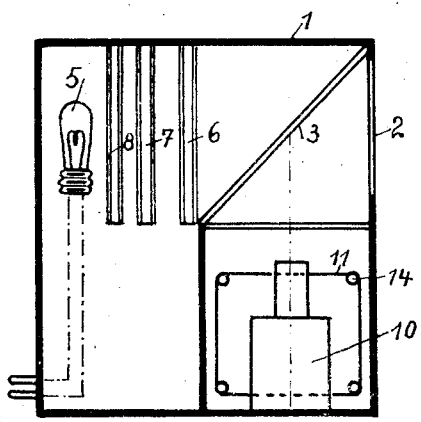
Figure 4:
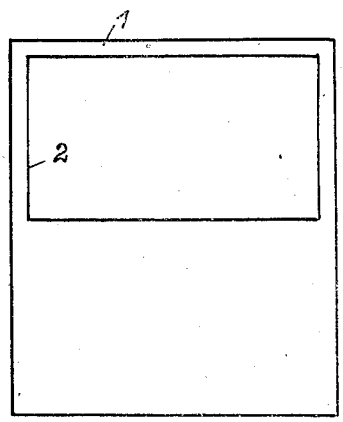

The invention has been shown on the accompanying drawings by way of exemplification in two embodiments, Figs. 1 and 2 representing respectively in longitudinal section and in side elevation one of the various possible exemplifications while another exemplification is shown in Figs. 3 and 4 in longitudinal section and in front view respectively.

In accordance with Fig. 1 there is arranged in the box 1 of any suitable size and at the rear of the window opening 2 thereof the inclined transparent mirror or reflecting glass plate 3 from the lower end of which extends the transverse partition 4. In the space between the transverse partition 4 and the front wall of the box 1 the transparent pictureplates are horizontally disposed, and underneath the same the source of light 5 is provided which may be disposed either on the bottom of the box or on the side walls or on the transverse partition 4. Three pictureplates 6, 7 and 8 may for instance be provided of which the picture-plate 7 for instance contains the picture of a room with two paintings while the plate 6 shows the furniture and the plate 8 is constructed so as to serve as color filter and is for instance adapted to produce a greenish coloration of the room of the representation, so as to make the impression of a wallpaper. With a view of doing away with the plate 8 I may also correspondingly color the plate 7. The plates 6, 7, 8 combined will result in the production of the scenery of a room in the manner shown in Fig. 2.

Instead of one lamp 5 I may, of course, provide a plurality thereof, and these sources of light may, if desired, be displaceable with relation to the plate 8 in the longitudinal and in the transverse direction, in order to be able to change the illumination of the scenery of the representation. In the space behind the inclined plate 3 a transparent projecting surface 9 is vertically disposed at the rear of which the cinematographic projecting apparatus 10 is mounted on the box 1. This apparatus may, of course, also be disposed separate from the box 1 which in the latter case will have to be provided with a suitable aperture at its rear wall. Through the apparatus 10 the picture film 11 is caused to move which may, for instance, project a moving figure of a dancer or the like upon the ground glass plate 9 which serves as the projection surface. The moving picture may appear on the film ribbon 11 lighted on a dark background or inversely. The film 11 may also be colored. By changing the distance of the projecting surface 9 from the mirror 3 the relative local position of the figure of the representation with regard to the scenery produced by the plates 6, 7, 8 may be modified in any desired manner. The box 1 may be provided for this purpose with various lateral slots 12 for the mounting of the projecting surface 9. The distance of the plates 6, 7, 8 from the mirror 3 may likewise be changed by providing a plurality of supporting slots 13 in the box 1. The film 1 is preferably in the form of an endless band which is guided over rollers or over smooth round rods 14, and is fed forward in the usual manner.

In order to also provide for the viewing of the reproduction from the side through the window opening 2 that is to say by an observer being not directly in front of the opening 2 but more or less beside this opening, the side walls of the box 1 may be coated with mirrors 15 or they may be provided in any other manner with reflecting surfaces. The projecting surface 9 may also be colored, so that the moving figure shown appears correspondingly colored. The projecting surface, instead of being arranged at the rear of the mirror 3 or of the glass plate, may also be disposed in front thereof, and it may be mounted at the window opening 2 as a transparent surface 16, consisting for instance of gauze or the like. In this case the moving scene apears in front of the immovable scenery of the plates 6, 7, 8 represented. The film 11 may also contain inscriptions or other representations instead of a movable figure, and it may be unicolored or multicolored. The film may also be employed for the purpose of reproducing a certain natural phenomenon, as for instance the moving clouds of a landscape or the moving ship of a marine scenery in combination with the scenery represented by the transparent plates. In the front wall of the box 1, a transparent pictural representation 17 with any desired pictural or other representation may be cut out or otherwise shown which, as appears from Figure 2, may be illuminated by the source of light 5.

As appears from figures 3 and 4, the projecting apparatus 10 may also be mounted vertically in front of the mirror 3. The dull, ground glass plate 9 serving as the projecting surface is in this case horizontally disposed below the mirror 3, while the transparent plates 6, 7, 8 are vertically mounted behind the mirror. The source of light 5 in this arrangement is likewise mounted in the space behind the mirror 3. The plates 6, 7, 8 in this arrangement may also be so disposed that their distance from the mirror 3 may be varied. In the front wall of the box 1 a transparent picture in accordance with Figure 2 with any desired pictural or other representation may be shown or cut out which is lighted by the source of light 5.

It should be understood that the details of the invention may be carried out in different modifications not shown in the drawings. Thus the number of the picture plates employed for the transparent representation may be increased at will in accordance with the scenery to be reproduced. Instead of employing two or more transparent picture plates one may employ only a single picture plate of this kind which is for instance the case, when it is desired to obtain a simple back ground for the scenery to be reproduced, as for instance for a certain colored surface. The receiving surface for the projected moving picture may then be arranged at any suitable inclination instead of being vertically or horizontally arranged, and it may be disposed upon the same side of the mirror or of the reflecting glass plate as the transparent picture plates, provided these plates will leave a sufficient free space for rendering the moving picture visible. It is also possible to project two or more moving pictures into the plastic total reproduced picture.

The invention is not to be restricted to the preferred embodiments herein shown and described, and I desire it to be understood that modifications may be made and that no limitations on the invention are intended other than those imposed by the scope of the appended claims.

I claim:—

1. In a device for producing delusion pictures in combination, a casing, a window opening in said casing, an inclined transparent reflecting surface opposite said window, a partition extending from said surface to the wall of said casing and forming chambers in said casing on either side of the reflecting surface, a plurality of spacedly parallel transparent picture carrying plates exchangeably disposed on the one side of said reflecting surface in the chamber formed at this side, a source of light adjustably arranged behind said picture plates so as to send its rays through them towards the reflecting surface, a projecting surface for projected pictures substantially disposed at a right angle to said picture carrying plates, cinematographic means for producing moving pictures on said projecting surface and additional reflecting surfaces sideways and transversely disposed with respect to the projecting surface and to the picture carrying plates.

2. In a device for producing delusion pictures having an inclined transparent reflecting surface, moving picture projecting means, a projection surface situated in the path of the rays of said projecting means and a complementary scenic effect behind said reflecting surface, the arrangement of means permitting to vary the distance of said projection surface from said reflecting surface, and further of spacedly parallel transparent picture carrying plates constituting said complementary scenic effect and exchangeably disposed at the one side of said reflecting surface at an angle thereto, and of a source of light located behind said plates so as to send its rays through said plates towards said reflecting surface.

3. In a device for producing delusion pictures having cinematographic means, a projection surface, an inclined transparent reflecting surface and a complementary scenic effect, the arrangement of a plurality of spacedly parallel transparent picture carrying plates constituting the complementary scenic effect and exchangeably disposed at the one side of said reflecting surface and at an angle thereto, and of a source of light disposed behind said picture plates so as to send its rays through them, and of means adapted to produce colored lighting of certain of said picture plates and of means allowing to vary the distance of said projecting surface from said reflecting surface.

4. In a device for producing delusion pictures having cinematographic means, an inclined transparent reflecting surface and a complementary scenic effect, the arrangement of a plurality of spacedly parallel transparent picture carrying plates constituting the complementary scenic effect and exchangeably disposed at the one side of said reflecting surface and at an angle thereto, and of a projection surface situated at the other side of said reflecting surface and of a source of light disposed behind said picture plates so as to send its rays through them, and of means permitting to vary the distance of said projection surfaces from said reflecting surface.

In testimony whereof I affix my signature.

FRITZ FLEISCHER.